United States Patent
Preobrazhensky et al.

(10) Patent No.: US 12,212,727 B2
(45) Date of Patent: *Jan. 28, 2025

(54) SYSTEM AND METHOD FOR SENDING, DELIVERY AND RECEIVING OF FAXES, INCLUDING DELIVERY OF FAXES WITH ADAPTIVE PROTOCOL SELECTION

(71) Applicant: Open Text Holdings, Inc., Menlo Park, CA (US)

(72) Inventors: Michael Alexander Preobrazhensky, Boulder, CO (US); Philippe C. Haussy, Longmont, CO (US); David M. Hayden, Bordentown, NJ (US)

(73) Assignee: OPEN TEXT HOLDINGS, INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/491,273

(22) Filed: Oct. 20, 2023

(65) Prior Publication Data
US 2024/0048664 A1 Feb. 8, 2024

Related U.S. Application Data

(63) Continuation of application No. 17/490,068, filed on Sep. 30, 2021, now Pat. No. 11,838,478, which is a continuation of application No. 16/800,910, filed on Feb. 25, 2020, now Pat. No. 11,178,307, which is a continuation of application No. 16/397,701, filed on Apr. 29, 2019, now Pat. No. 10,616,441, which is a
(Continued)

(51) Int. Cl.
*H04N 1/327* (2006.01)
*H04L 69/18* (2022.01)
*H04N 1/32* (2006.01)

(52) U.S. Cl.
CPC ........ *H04N 1/32789* (2013.01); *H04L 69/18* (2013.01); *H04N 1/32566* (2013.01); *H04N 1/32587* (2013.01); *H04N 1/32641* (2013.01); *H04N 1/32765* (2013.01); *H04N 2201/0025* (2013.01); *H04N 2201/0039* (2013.01); *H04N 2201/0049* (2013.01); *H04N 2201/0067* (2013.01); *H04N 2201/0093* (2013.01); *H04N 2201/3335* (2013.01); *H04N 2201/33357* (2013.01)

(58) Field of Classification Search
None
See application file for complete search history.

(56) References Cited

U.S. PATENT DOCUMENTS

| 10,321,013 | B2 * | 6/2019 | Preobrazhensky | ..... H04L 69/18 |
| 10,616,441 | B2 * | 4/2020 | Preobrazhensky | H04N 1/32566 |
| 11,178,307 | B2 * | 11/2021 | Preobrazhensky | H04N 1/32641 |

(Continued)

*Primary Examiner* — Stella L. Woo
(74) *Attorney, Agent, or Firm* — Sprinkle IP Law Group

(57) ABSTRACT

Embodiments of a fax system with adaptive protocol selection, and methods for such a system, are disclosed herein. Embodiments of a fax system may be adapted to selectively configure the protocol (both the type of protocol or aspects of a particular protocol) used in association with the transmission or reception of a specific fax. The configuration of the protocol utilized can be based on one or more attributes associated with a sender or a destination. The fax can then be transmitted or received according to those configuration parameters.

21 Claims, 4 Drawing Sheets

Related U.S. Application Data continuation of application No. 15/878,668, filed on Jan. 24, 2018, now Pat. No. 10,321,013.

(60) Provisional application No. 62/453,363, filed on Feb. 1, 2017.

(56) References Cited

U.S. PATENT DOCUMENTS

| | | | |
|---|---|---|---|
| 11,838,478 B2* | 12/2023 | Preobrazhensky | ............................ H04N 1/32641 |
| 2004/0109437 A1* | 6/2004 | Tanimoto | ................... H04L 9/40 370/395.5 |
| 2007/0280122 A1* | 12/2007 | Ito | ........................ H04L 65/1069 370/250 |
| 2013/0044795 A1* | 2/2013 | Busak | ................ H04N 1/33361 375/222 |

* cited by examiner

SYSTEM AND METHOD FOR SENDING, DELIVERY AND RECEIVING OF FAXES, INCLUDING DELIVERY OF FAXES WITH ADAPTIVE PROTOCOL SELECTION

RELATED APPLICATION(S)

This application is a continuation of, and claims a benefit of priority under 35 U.S.C. 120 of the filing date of U.S. patent application Ser. No. 17/490,068, filed Sep. 30, 2021, issued as U.S. Pat. No. 11,838,478, entitled "SYSTEM AND METHOD FOR SENDING, DELIVERY AND RECEIVING OF FAXES, INCLUDING DELIVERY OF FAXES WITH ADAPTIVE PROTOCOL SELECTION", which is a continuation of, and claims a benefit of priority under 35 U.S.C. 120 of the filing date of U.S. patent application Ser. No. 16/800,910, filed Feb. 25, 2020, issued as U.S. Pat. No. 11,178,307, entitled "SYSTEM AND METHOD FOR SENDING, DELIVERY AND RECEIVING OF FAXES, INCLUDING DELIVERY OF FAXES WITH ADAPTIVE PROTOCOL SELECTION", which is a continuation of, and claims a benefit of priority under 35 U.S.C. 120 of the filing date of U.S. patent application Ser. No. 16/397,701, filed Apr. 29, 2019, issued as U.S. Pat. No. 10,616,441, entitled "SYSTEM AND METHOD FOR SENDING, DELIVERY AND RECEIVING OF FAXES, INCLUDING DELIVERY OF FAXES WITH ADAPTIVE PROTOCOL SELECTION", which is a continuation of, and claims a benefit of priority under 35 U.S.C. 120 of the filing date of U.S. patent application Ser. No. 15/878,668, filed Jan. 24, 2018, issued as U.S. Pat. No. 10,321,013, entitled "SYSTEM AND METHOD FOR SENDING, DELIVERY AND RECEIVING OF FAXES, INCLUDING DELIVERY OF FAXES WITH ADAPTIVE PROTOCOL SELECTION," which claims a benefit of priority under 35 U.S.C. § 119 from U.S. Provisional Patent Application No. 62/453,363, filed Feb. 1, 2017, entitled "SYSTEM AND METHOD FOR SENDING, DELIVERY AND RECEIVING OF FAXES, INCLUDING DELIVERY OF FAXES OVER A COMPUTER BASED NETWORK ACCORDING TO SECURITY OR OTHER PROTOCOLS," by inventors Preobrazhensky et al., the entire contents of which are hereby fully incorporated by reference herein for all purposes.

TECHNICAL FIELD

This disclosure relates generally to digital content delivery in a network environment. More particularly, this disclosure relates to the transmission, delivery or reception of data through computer based networks or telephone networks. Even more specifically, this disclosure relates to the transmission, delivery or reception of faxes through computer based networks or telephone networks, including adaptive protocol use during sending or receiving of a fax in association with individual destinations.

BACKGROUND

Entities such as consumers, organizations, enterprises, governments, health care entities, etc. need to exchange data for a variety of reasons, as may be easily imagined. In the modern world, this data exchange is often times accomplished electronically using a variety of methodologies. These methodologies include, for example, local storage (e.g., a thumb driver holding the data which can be physically delivered to a recipient), file transfer using particular protocols (e.g., file transfer protocol (FTP)), sending an e-mail with an attachment, fax, etc.

While all these methods serve the same end, each of these methodologies has differing capabilities with respect to various characteristics such as ease of use, speed, security (e.g., the ability to resist interception or tampering), traceability, cost, etc. For example, using local storage may not be feasible if two entities are widely dispersed geographically.

Accordingly, traditional fax machines have been successfully relied upon to transmit electronic documents over the public switched telephone network (PSTN) for some time. A facsimile (fax) comprises a document in a digital image format. The document is associated with a destination specified with respect to the PSTN. Thus, typically for at least a portion of the transmission, the document is transmitted over the PSTN. Faxing provides a secure, traceable and non-repudiable mechanism for content delivery and can be particularly useful in certain environments.

In a typical office environment equipped with a private packet-switched data network and access to a public packet-switched data network such as the Internet, a server is connected to the PSTN. The server is also connected to the private packet-switched data network and, typically, the Internet. From the perspective of the server, the PSTN is both a source of incoming faxes as well as a destination of outgoing faxes. "Online" fax services which make use of e-mail to communicate between a user with an e-mail account and a traditional fax machine may also be available.

Thus, in many cases, the network over which a document is transmitted may not be homogeneous. Specifically, the network over which a document is transmitted to the specified destination on the PSTN may be comprised of many different types of sub-networks (including computer networks or telephone networks (e.g., including cellular networks)). The variable nature of the networks over which a fax may be transmitted may introduce latency or other issues into the transmission of a fax. While some fax systems may utilize other methods to transmit the fax in case of problematic transmissions, there is no coherent way to selectively utilize certain protocols or aspects of those protocols in the transmission of faxes, or to easily manage the use of those protocols or aspects.

Generally, then it would be desirable to be able to selectively utilize certain protocols or aspects of a protocol in association with individual fax transmissions, both when transmitting or receiving faxes.

SUMMARY

Embodiments of a fax system with adaptive protocol selection, and methods for such a system, are disclosed herein. Embodiments of a fax system may be adapted to selectively configure the protocol (both the type of protocol or aspects of a particular protocol) used in association with the transmission or reception of a specific fax. The configuration of the protocol utilized can be based on one or more attributes associated with a sender or a destination. In particular, the destination on the PSTN to which the fax is being transmitted may be used to determine one or more communication parameters associated with that destination. The fax can then be transmitted or received according to those configuration parameters.

In particular, according to certain embodiments, a faxing system may include a data store storing one or more destination entries, each destination entry including a destination on a publicly switched telephone network (PSTN) and a set of communication parameters, each communication parameter specifying a value for the communication parameter. The fax system can be configured for determining an initial set of communication parameters with corresponding values; receiving a document for transmission to a specified destination on the PSTN; determining that a destination entry corresponding to the specified destination exists in the data store; determining the set of communication parameters associated with the destination entry corresponding to the specified destination; determining a set of parameters to use for transmitting the document by replacing the value of one or more of the initial set of communication parameters with the value for a corresponding communication parameter from the set of communication parameters associated with the destination entry; and transmitting the document over the PSTN according to the set of parameters.

In another embodiment, the faxing system includes a data store storing one or more recipient entries, each recipient entry including a destination and a set of communication parameters, each communication parameter specifying a value for the communication parameter. The fax system is configured for receiving an incoming call for a fax; determining a destination associated with the fax; determining an initial set of communication parameters with corresponding values for the fax; determining that a recipient entry corresponding to the destination associated with the fax exists in the data store; determining the set of communication parameters associated with the recipient entry corresponding to the destination associated with the fax; determining a set of parameters to use for the fax by replacing the value of one or more of the initial set of communication parameters with the value for a corresponding communication parameter from the set of communication parameters associated with the recipient entry; and negotiating the fax with the sender using the set of parameters determined for the fax.

In some embodiments, the corresponding communication parameter is a fax protocol or an aspect of a fax protocol and the value is to enable or disable.

In certain embodiments, the aspect of the fax protocol is Error Correction Mode (ECM), compression or a data rate.

Accordingly, embodiments as presented herein may result in a number of advantages and improvements to the functionality of existing faxing and computer technology. Specifically, in this manner, persistent adaptive protocol selection may be used in conjunction with certain destinations, groups, users, or other entities to ensure that appropriate protocols or features of a particular protocol are utilized in conjunction with the transmission or reception of faxes to or from those entities. By persisting the communication parameters to utilize such that they can be utilized with substantially all faxes to or from those entities (e.g., until the communication parameters are modified), greater throughput, speed and efficiency of a fax server can be achieved, as desired communication protocols (or aspects of protocols) may be utilized, even with respect to the first fax transmission to, or from, a destination.

Moreover, by persisting these communication parameters in a distributed or centralized manner in instances where multiple fax servers are deployed in a faxing system, the advantages of individually tailoring faxing to specific destinations can be achieved without having to individually configure each of the fax servers.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

DETAILED DESCRIPTION

Figure 1:
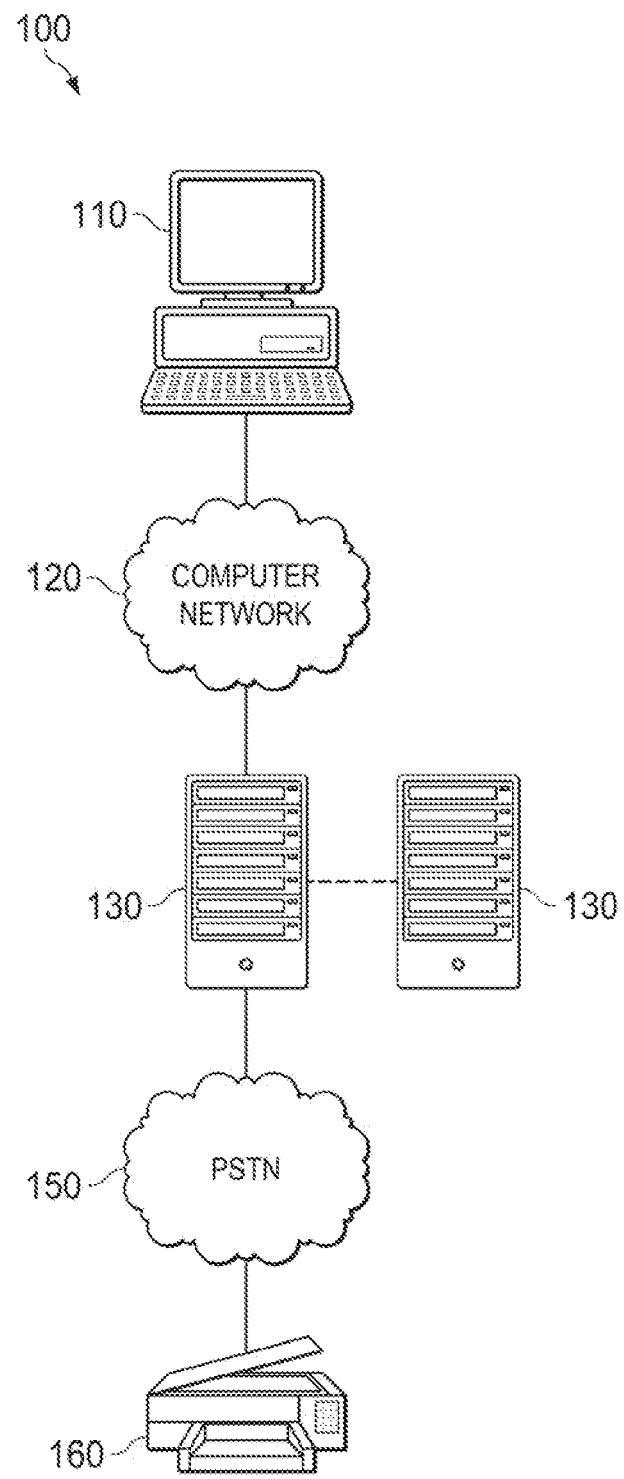
FIG. 1 depicts an architecture for a faxing system.

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

As described above, entities need to exchange data for a variety of reasons. This data exchange is often times accomplished electronically using a variety of methodologies. While all these methods serve the same end, each of these methodologies has differing capabilities with respect to various characteristics such as ease of use, speed, security (e.g., the ability to resist interception or tampering), traceability, cost, etc. For example, using local storage may not be feasible if two entities are widely dispersed geographically.

Accordingly, traditional fax machines have been successfully relied upon to transmit electronic documents over the PSTN for some time. Faxing, while still heavily utilized by individuals and the workflows of various enterprises may also present some difficulties. A facsimile (fax) comprises a document in a digital image format. The document is associated with a destination specified with respect to the PSTN. Thus, typically for at least a portion of the transmission, the document is transmitted over the PSTN. Faxing provides a secure, traceable and non-repudiable mechanism for content delivery and can be particularly useful in certain environments.

In a typical office environment equipped with a private packet-switched data network and access to a public packet-switched data network such as the Internet, a server is connected to the PSTN by one or more dedicated lines, such as fiber optic or copper T1/E1 lines. The server is also connected to the private packet-switched data network and, typically, the Internet. From the perspective of the server, the PSTN is both a source of incoming faxes as well as a destination of outgoing faxes. Further, the server may recognize computers and other computing devices connected to the private and public packet-switched data networks as both a source of incoming faxes as well as a destination of outgoing faxes.

"Online" fax services are available which make use of e-mail to communicate between a user with an e-mail account and a traditional fax machine. Because e-mail provides a means to send electronic documents of various formats between users by way of an "attachment" of the electronic documents, online fax services receive e-mail attachments, encode the attachments to a form suitable for use by a traditional fax machine, and transmit the encoded attachments to a traditional fax machine over the PSTN.

FIG. 1 illustrates a simplified diagram of one implementation of fax system 100. System 100 includes a computer 110, a packet-switched computer network 120, a server 130, a PSTN 150, and a traditional fax machine 160. The computer 110 is coupled to the packet-switched computer network 120 to facilitate data communication between the computer 110 and one or more servers 130. The server 130 is configured to host websites, host e-mail services or host facsimile services.

In operation of the system 100, a user of the computer 110 attaches an electronic document to an e-mail and sends the e-mail, using the e-mail services hosted by the server 130, where the document is intended for a recipient, such as the traditional fax machine 160 or other endpoint associated with a destination on the PSTN. To that end, the e-mail and electronic document attached to the e-mail are transmitted from the computer 110 to the server 130, where the e-mail and electronic document are received by the e-mail service of the server 130. The e-mail service may separate the electronic document from the e-mail and provide the electronic document to the facsimile services of the server 130, along with the specific destination (e.g., a PSTN telephone number) for delivery of the electronic document to a traditional fax machine over the PSTN 150. The facsimile services of the server 130 then transmits the electronic document to the traditional fax machine 160 over the PSTN 150, based on the specific destination. Finally, the fax machine 160 produces a printed copy of the electronic document received from the server over the PSTN 150. The fax over e-mail system 100 may also receive faxes from the traditional fax machine 160 and transmits the faxes to the computer 110 over the packet-switched computer network 120 as an attachment to an e-mail.

In many cases, however, the network over which the document is transmitted may not be homogeneous. Specifically, the network over which a document is transmitted to the specified destination on the PSTN may be comprised of many different types of sub-networks. These sub-networks may be of many different types. In fact, the network over which the document may be transmitted may include portions comprised of both a traditional PSTN (e.g., a Plain Old Telephone Service (POTS)) and portions including a computer network (e.g., where the document may be transmitted over the computer network using Voice of Internet Protocol (VOIP) network or other data over a packet switched network).

The variable nature of the networks over which a fax may be transmitted may introduce latency or other issues into the transmission of a fax. These issues are particularly challenging, for example, when transmitting according to the V.34 protocol. The V.34 protocol was designed to transmit at 33.6 kbps on a solid POTS network. If however, one or more voice lines is replaced in the transmission network with one or more computer networks using VOIP to transmit the fax, transmission of faxes using the V.34 protocol may fail.

While most fax systems may fall back to more limited data rates or other protocols (e.g., V.33, V.17, V.27, V.29, etc.) to re-transmit a fax, this may introduce latency or management issues as the re-transmission status must be maintained and tracked. Moreover, in many cases, the desired data rate or protocol may be utilized if certain aspects or functionality of the protocol are not utilized. For example, in many cases it may be possible to transmit to such destinations if ECM is disabled.

Generally, then it would be desirable to be able to selectively utilize certain protocols or aspects of a protocol in association with individual fax transmissions, both when transmitting or receiving faxes.

To that end, attention is now directed to embodiments of a fax system as presented herein. Such a fax system may be adapted to selectively configure the protocol (e.g., both or wither of the type of protocol or aspects of a particular protocol) used in association with the transmission or reception of a specific fax. The configuration of the protocol utilized can be based on one or more attributes associated with a sender or a destination. In particular, the destination on the PSTN to which the fax is being transmitted may be used to determine one or more communication parameters associated with that destination. The fax can then be transmitted or received according to those configuration parameters.

According to certain embodiments then, for the transmission of a fax, a fax board or other faxing hardware or software may be configured according to the communication parameters and the document provided for transmission to the destination according to those parameters. For the reception of a fax, when the fax session or call is being established with the sender, only capabilities associated with the communication parameters determined for the intended destination may be exchanged with the sender (e.g., during handshaking or negotiation), ensuring that the sender may substantially only select from among these desired parameters when possible.

In this manner, persistent adaptive protocol selection may be used in conjunction with certain destinations, groups, users, or other entities to ensure that appropriate protocols or features of a particular protocol are utilized in conjunction with the transmission or reception of faxes to or from those entities. By persisting the communication parameters for use, such that they can be utilized with substantially all faxes to or from those entities (e.g., until the communication parameters are modified), greater throughput, speed and efficiency of a fax server can be achieved, as desired communication protocols (or aspects of protocols) may be utilized, even with respect to the first fax transmission to, or from, a destination.

Moreover, by persisting these communication parameters in a distributed or centralized manner in instances where multiple fax servers are deployed in a faxing system, the advantages of individually tailoring faxing to specific destinations can be achieved without having to individually configure each of the fax servers.

Figure 2:
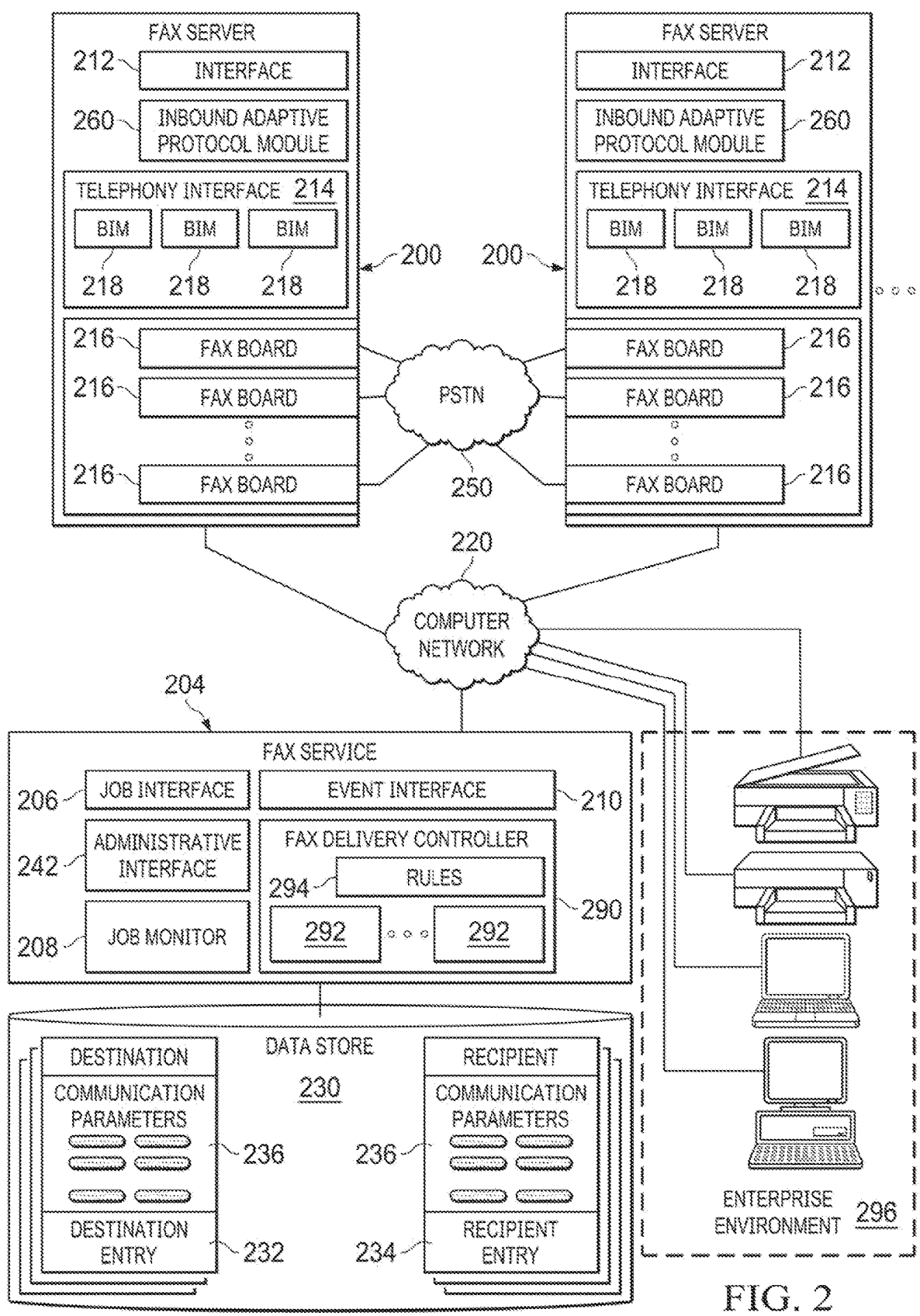
FIG. 2 depicts one embodiment of an architecture for a faxing system.

Turning now to FIG. 2, one embodiment of a topology for a network including an embodiment of a fax system is depicted. The fax system includes one or more fax servers 200 coupled to a fax service 204 over a computer network 220 such as an intranet, a wide area network (WAN), a local area network (LAN), the Internet, a wireless network, a wired network, or some combination of these types of networks.

Fax service 204 offers a job interface 206 through which users of one or more enterprise environments 296 (or software or hardware associated with the users) may submit faxing jobs to the fax service 204. These jobs may include a document (e.g., almost any electronic content) and one or more destinations (e.g., specified with respect to the PSTN 250, such as phone number). When a job is submitted to the fax service 204, job monitor 208 may track and process the job and return a response to the job submitter or initiator through the job interface 206.

The job monitor 208 may schedule a workflow for the job, including a number of tasks for the submitted job. For example, one or more of the tasks may include document processing tasks such as the conversion of a document from a received format to a format suitable for faxing (e.g., a TIFF format). One or more of the tasks for the job may include the actual transmittal of the document to the one or more destinations specified in the received job.

Accordingly, for each of the specified destinations (e.g., telephone numbers or other location where the document is to be sent) in the submitted job, the job monitor 208 may issue a fax sending request to one of the fax servers 200 through the interface 212 offered by the fax server 200. This fax request may include at least the destination (e.g., as specified in the job request), the document associated with the job and possibly one or more parameters associated with the transmission of the fax, including for example, the faxing protocol to use or aspects or components of the protocol to use. These parameters may be default parameters, parameters specifically determined by the fax service 204 or parameters specified by the submitter or initiator of the job.

In one embodiment, a fax delivery controller 290 may be utilized in association with the job monitor 208 to control or orchestrate (used interchangeably herein) the transmission of a fax associated with the fax sending request. In particular, the fax delivery controller 290 may create a delivery item 292 associated with a fax sending request. The delivery item 292 may be a data structure such as an in-memory data structure storing data associated with the fax sending request, including, for example, the destination, parameters (e.g., including the faxing protocol) being used to send the fax, the received document, information regarding the success or failure of transmissions, the number of retry attempts made, or other data associated with the fax sending request or the transmission of an associated fax.

It should be noted here that while FIG. 2 depicts only the fax service 204 and fax servers 200 as part of the faxing system, in other embodiments one or more intermediary services or managers or other services or servers may be utilized (e.g., between the fax service 204 and fax servers 200) to, for example, abstract certain interfaces or provide a more distributed architecture.

When a fax server 200 receives a fax sending request from the fax service 204 through the interface 212, the fax server 200 may then utilize telephony interface 214 to determine an appropriate fax board 216 to utilize for sending the requested fax over the PSTN 250 based on, for example, the destination or parameters associated with the received fax sending request. These fax boards 216 may include, for example, fax boards 216 from Brooktrout, Aculab, Eicon, Intel or other manufactures. While referred to as fax boards, it will be understood that these fax boards 216 may be virtual or emulated fax boards, other types of software, remotely deployed interfaces or services, or the like.

Each of these different types of fax boards 216 may have a different type of interface (e.g., Application Programming Interface (API)) for interaction with that particular board 216. Telephony interface 214 may thus include one or more board interface modules (BIM) 218, where each BIM 218 is configured to communicate with a corresponding fax board 216 according to the interface utilized by that fax board 216.

Accordingly, telephony interface 214 may configure a selected fax board 216 according to the parameters of the received fax request using a corresponding BIM 218 and send the document as a fax over the PSTN 250 according to the parameters of the received fax request using the selected fax board 216. Depending on the results of the transmission of the fax, a response may be returned to the fax delivery controller 290 through the interface 212.

In one embodiment, individual adaptive protocol selection may also be implemented using fax delivery controller 290. Here, when a fax is transmitted through telephony interface 214, if there is a problem transmitting the fax (e.g., the fax negotiation or transmission fails) the fax board 216 may report this error to the telephony interface 214 through the API. The telephony interface 214 can then notify the interface 212, which sends a failure response to the fax delivery controller 290 of the fax service 204 (e.g., using an identifier associated with the fax).

The fax delivery controller 290 can access the delivery item 292 associated with the fax to determine which faxing protocol (and aspects of that faxing protocol) was utilized to attempt to transmit the fax. The fax delivery controller 290 can then select another fax protocol (or aspect of the faxing protocol) for use in transmitting the fax, update the associated delivery item 292 accordingly and re-try the fax transmission using the selected protocol by sending a subsequent request to send the fax to a fax server 200 (e.g., through the job monitor 208), where this fax request may include at least the destination (e.g., as specified in the job request), the updated parameters (e.g., the parameters updated with the selected protocol or aspect of protocol).

The fax delivery controller 290 may therefore be configured with a set of rules 294 including, for example, a progression sequence of two or more fax protocols or aspects of faxing protocols, where the progression may be in order of descending data rate. For example, a rule 294 or progression may specify that if one or more attempts have been made to transmit the fax at a particular fax protocol (e.g., v.34) a protocol at a lower rate may be selected (e.g., v.17) and a re-try of the fax transmission at the lower rate protocol attempted. As another example, a rule 294 may specify that if one or more attempts have been made with ECM turned on, an attempt may be made with ECM turned off. These rules 294 may be assigned or associated with a priority, hierarchy, order of evaluation or number of failure attempts such that the rules may be determined and evaluated based on, for example, a number of failed attempts, last protocol (or aspect of a protocol used) or other parameters associated with a delivery attempt. Other rules are possible and are fully contemplated herein).

Thus, if one or more delivery attempts at a particular fax protocol (or using an aspect of a protocol) have failed, the next fax protocol or another aspect of faxing protocol using the progression of rules 294 may be selected, the associated delivery item 292 updated accordingly, and the fax transmission re-tried using the selected protocol. In this manner, individual adaptive protocol selection may be implemented by selecting an appropriate protocol (or aspects of a protocol) for the delivery of a particular fax to a particular destination, regardless of the parameters used to attempt the original fax transmission to that destination.

The reception of faxes using the fax system 200 may work substantially similarly. Specifically, an incoming call may be received at a fax board 216 of a fax server 200 over the PSTN 250. An event may be raised by the fax board 216 to the telephony interface 214 which uses the appropriate BIM 218 to configure the fax board 216 to receive the incoming fax from the PSTN 250. This configuration may include the parameters to exchange with the sender of the fax when faxing capabilities are exchanged during capabilities negotiation or handshaking. The incoming fax can then be received at the fax server 200 and stored.

When the reception of the fax over the PSTN 250 is complete, the fax server 200 may raise a received fax event with the fax service 204 through the event interface 210 of the fax service 204 and transmit the received document and destination information to the fax server 204 over the computer network 220.

The fax service 204 can then distribute the received fax to the appropriate destination within the enterprise 290 based on the destination associated with the received fax.

As discussed above, the variable nature or composition of the PSTN 250 may introduce latency or other issues into the transmission of faxes from fax servers 200. The latency or other issues may be specific to the transmission of faxes to certain destinations. In other words, transmissions of faxes to certain destinations may be accomplished without issues (e.g., at a high rate of speed such those using the V.34 protocol or using ECM) while for other destinations transmission of faxes according to certain parameters (e.g., at a high rate of speed such those using the V.34 protocol or using ECM) would cause the transmission of the fax to fail.

It would be desirable to tailor the parameters used for a fax based on the destination and in particular to be able to selectively utilize certain protocols or aspects of a protocol in association with individual fax transmissions to different destinations based on the destination, both when transmitting or receiving faxes. In the past such capabilities have been lacking in faxing systems.

To provide such capabilities in embodiments of faxing system 200, fax service 204 may include, or communicate with, data store 230 including destination entry records 232 and recipient entry records 234. Destination entry records 232 may be used to individually tailor faxes being sent to a destination associated with a destination entry record 232 (e.g., a fax sent to the destination) while recipient entry records 234 may be used to individually tailor the transmission of faxes intended for a destination associated with a recipient entry record 234.

In one embodiment, the data store 232 may be a relational database or the like, and each entry 232, 234 may have a communication parameter field that may be a variable size text field, such that it can contain one or more key value pairs comprising the communication parameters 236. Each key specifies a parameter and the value specifies the corresponding value for that parameter to use with the destination of the entry. These parameters may include, without limitation, parameters related to modulation protocols to use (e.g., V.34, V.33, V.27, etc.), encoding types, ECM (e.g., to use or not use), max data rate to use, no answer timeout, negotiation timeout or fax protocol.

In particular, each of the destination entry records 232 and recipient entry records 234 may be associated with a particular destination on the PSTN 250 (e.g., a telephone number) and include one or more communication parameters 236 (e.g., referred to as comm_parms or comm_params). An example of the contents of a destination entry record 232 or recipient entry record 234 is as follows (note here that with respect to this example, there is a single communication parameters 236 key value pair (maxrate: 4800) under the labeled % comm_parms of the record):

addr_type: fax
to: 16178304835
entity type: user
entity num: 20377
date: Thu Feb. 12 12:22:00 EST 2015
   Header:
% comm_parms
maxrate: 4800

An example of data that may be contained in such entry records, is an address. An address (e.g., a value associated with a key such as "Address" or "To") may be a normalized phone number: digits only, consisting of the country code, city (area) code, and phone number. For example: 16094240705 or 4454367893. An address type (e.g., a value associated with a key such as "addr_type") may include a type of the address for an entity associated with the entry record (e.g., fax, voice, e-mail, etc.).

As another example of such data, an entity type (e.g., a value associated with a key such as "entity type") may be, for example, a type of entity associated with the entry record, such as a user, customer, domain or all. An entity number (e.g., a value associated with a key such as "entity num") may be an identifier associated with that entry record or entity. The entity type and entity number may define the jobs to which the entry record will apply. For example, the entry record may be utilized for a job (e.g., determined to be a destination entry records 232 or recipient entry records 234 associated with a destination) if the address type and destination or recipient destination match. Or if, for example, the entry record's entity type is "user" and the entity number matches an identifier (e.g., user identifier) of the job, the record's entity type is "customer" and the entity number matches the job's customer number, or the entry record's entity type is "domain" and the job originated from, or is destined for, that domain.

The communication parameters 236 of a destination entry records 232 or recipient entry records 234 may specify a parameter that may be utilized with a fax transmission (or reception) and a value for that parameter to be used for the destination of that entry 232, 234. Non-limiting examples of communication parameters are given below.

In one embodiment, to facilitate the setting of communication parameters 236 for an entry 232, 234 the fax service 204 may include administrative interface 242. This interface may be a browser based interface, a command line interface, or other type of interface which may be accessed by a user (e.g., affiliated with an enterprise operating enterprise environment 296). Using the interface 242 a user may create an entry 232, 234 for a particular destination (e.g., telephone number) and specify one or more communication parameters and associated values for those communication parameters. The user may also specify whether the entry will be a destination entry 232 or a recipient entry 234.

Alternatively, in some embodiments, fax service 204 may gather and analyze statistics associated with a destination to automatically create or revise the communication parameters 236 for an entry 232, 234. For example, if fax servers 200 report to the fax service 204 that faxing to certain destinations has failed using a certain fax protocol setting over a threshold number of times the fax service 204 may set a communication parameter in the destination entry 232 associated with that destination to indicate that faxing according to that protocol setting should be disabled.

In operation of the faxing system 200, the entries 232, 234 in the data store 230 may be utilized to adaptively select protocols, or aspects thereof, to individually tailor a fax to a particular destination. As discussed, when a job is submitted to the fax service 204 job monitor 208 may track and process the job and return a response to the job submitter or initiator through the job interface 206, where one or more of the tasks for the job may include the actual transmittal of the document to the one or more destinations specified in the received job.

Accordingly, the job monitor 208 may iterate through each of the destinations specified in the received job request and for each of the specified destinations in the submitted job the job monitor 208 may issue a fax sending request to one of the fax servers 200 through the interface 212 offered by the fax server 200. To create the fax sending request the job monitor 208 may determine a set of initial parameters for the request, where these parameters may be default parameters, parameters specifically determined by the fax service 204 or parameters specified by the submitter or initiator of the job. Additionally, the job monitor 208 may determine if a destination entry 232 associated with the specified destination exists in the data store 230.

If a destination entry 232 for the specified destination exists, the entry 232 may be obtained, and the job monitor 208 can determine if the entry 232 has any specified communication parameters 236. If there are any specified communication parameters 236 in the entry 232 for the specified destination, the set of parameters for the fax request may be generated by including the values for the communication parameters specified in the entry 232 with the initial set of parameters for the request, or by using the values for specified parameters in the entry 232 to override or replace a corresponding value for that parameter in the set of initial parameters determined for the fax request.

In some embodiments, job monitor 208 may have logic for reconciling or resolving incompatible communication parameters (e.g., where the entry 232 for that destination specifies a particular value for a communication parameter but a different parameter in the initial set of parameters is incompatible with the value for the parameter specified in the entry 232). For example, ECM is a communication parameter that may be turned on or off. However, when either certain data compression (e.g., Modified Modified Read (MMR) (T.6)) or certain modulation standards (e.g., V.34) are used, ECM must be on and enforced. Thus, in this case if an initial parameter or a communication parameter in an entry specifies these types of data compression or modulation standards, a rule of such logic may specify that ECM is to be utilized (e.g., regardless of whether a value for ECM in an entry 232 specified that ECM should not be used).

Similarly, when certain data rate is selected, but the chosen or specified modulation protocol set does not support it, such protocol may be utilized or added to a set of protocols to try. In other words, the logic may include a rule prioritizing the selection of data rate over the protocol specified, and specify the selection of a protocol for use with the specified data rate. For example, the V.xx modulations and their supported data rates (in bits per second (bps)) may be: V.29-9600, 7200; V.27-4800, 2400; V.17-14400, 12000, 9600, 7200; V.33-14400, 12000; V.34-33600, 31200, 28800, 26400, 24000, 21600, 19200, 16800, 14400, 12000, 9600, 7200, 4800, 2400. As an example, then, if only V.29 and V.17 are specified by the parameters (e.g., initial or by an entry) and the data rate requested is 4800 the logic may select V.27 as the first protocol to utilize (e.g., as V.27 is a protocol that supports a 4800 bps data rate.

The fax request for the specified destination can then be generated to include the specified destination, the document associated with the job and the determined parameters for the request, including for example, the faxing protocol to use or aspects or components of the protocol to use. The fax request may then be sent by the job monitor 208 to a fax server 200.

When a fax server 200 receives a fax sending request through the interface 212, telephony interface 214 may determine an appropriate fax board 216 to utilize for sending the requested fax over the PSTN 250 based on, for example, the destination or parameters associated with the received fax sending request. Telephony interface 214 configures a selected fax board 216 according to the parameters of the received fax request using a corresponding BIM 218, and sends the document as a fax over the PSTN 250 according to the parameters of the received fax request (if possible) using the selected fax board 216. Depending on the results of the transmission of the fax, a response may be returned to the fax service 204 through the interface 212.

Recipient entries 234 may also be used to individually tailor the transmission of incoming faxes. As these faxes may originate from outside the faxing system, and be received at fax server 200, it may be desirable to avoid unnecessary latency, communications or processing required for communicating with, or utilizing, the fax service 204 any more than needed to make determinations for communication parameters for transmission of such a fax.

Accordingly, each fax server 200 may include an inbound adaptive protocol module 260. When an incoming call is received at a fax board 216 of a fax server 200 over the PSTN 250, an event may be raised to telephony interface 214 which may, in turn, raise an event for the incoming call to the inbound adaptive protocol module 260. The event may include an identification of the specified destination (e.g., for the incoming fax). The inbound adaptive protocol module 260 receives inbound fax notification events from telephony interface 214 and determines a set of communication parameters to utilize for the inbound fax. In particular, the inbound adaptive protocol module 260 may communicate with the data store 232 (e.g., using a remote procedure call or remote database connectivity) to determine if there is a recipient entry 234 for the specified destination, and obtain the communication parameters and their associated values for the recipient entry 234 if an entry exists in the data store 230 for the specified destination.

If any communications parameters for the specified destination exist in a recipient entry 234 for the destination they may be returned to the requesting inbound adaptive protocol module 260. The inbound adaptive protocol module 260 may then return these communication parameters and their values to the telephony interface 214.

The telephony interface 214 uses the appropriate BIM 218 to configure the fax board 216 to receive the incoming fax from the PSTN 250 according to these values for those communication parameters. The values for these communication parameters may be used in lieu of other values for those communication parameters or the determined communication parameters and their values may be added to other communication parameters to be utilized in the reception of the incoming fax. In particular, the telephony interface 214 may configure the fax board 216 to utilize the values for these communication parameters when exchanging or negotiating faxing capabilities (e.g., during handshaking) with the sender of the fax. By using these communication parameters during the negotiating process the sender of the fax may be informed that the receiving fax board 216 has only these capabilities available (irrespective of the actual capabilities of the fax board 216 or fax server 200) and may transmit the fax accordingly (e.g., based on the values determined for the communication parameters from the recipient entry 234). In this manner, the transmission of faxes may be tailored to specified communication parameters, even when the faxing system 200 is receiving such a fax.

The incoming fax is then received at the fax server 200 through the fax board 216 and stored. When the reception of the fax over the PSTN 250 is complete, the fax server 200 may raise a received fax event with the fax service 204 through the event interface 210 of the fax service 204 and transmit the received document and destination information to the fax server 204 over the computer network 220. The fax service 204 can then distribute the received fax to the specified destination (e.g., within the enterprise 290).

It will be noted that to further reduce latency, increase speed or reduce processing overhead it may be desirable to replicate data store 230 (or entries 232, 234 of data store or only destination entries 232 or recipient entries 234 of data store 230) in one more additional data stores physically or logically closer to the one or more fax servers 200. Accordingly, in some embodiments each fax server 200 may have a data store which stores recipient entries 234. These recipient entries 234 may be replicated or copied from data store 230 at some interval such as hourly, daily, or according to another set of rules. Other methods of synchronization may be possible and are contemplated here.

Figure 3:
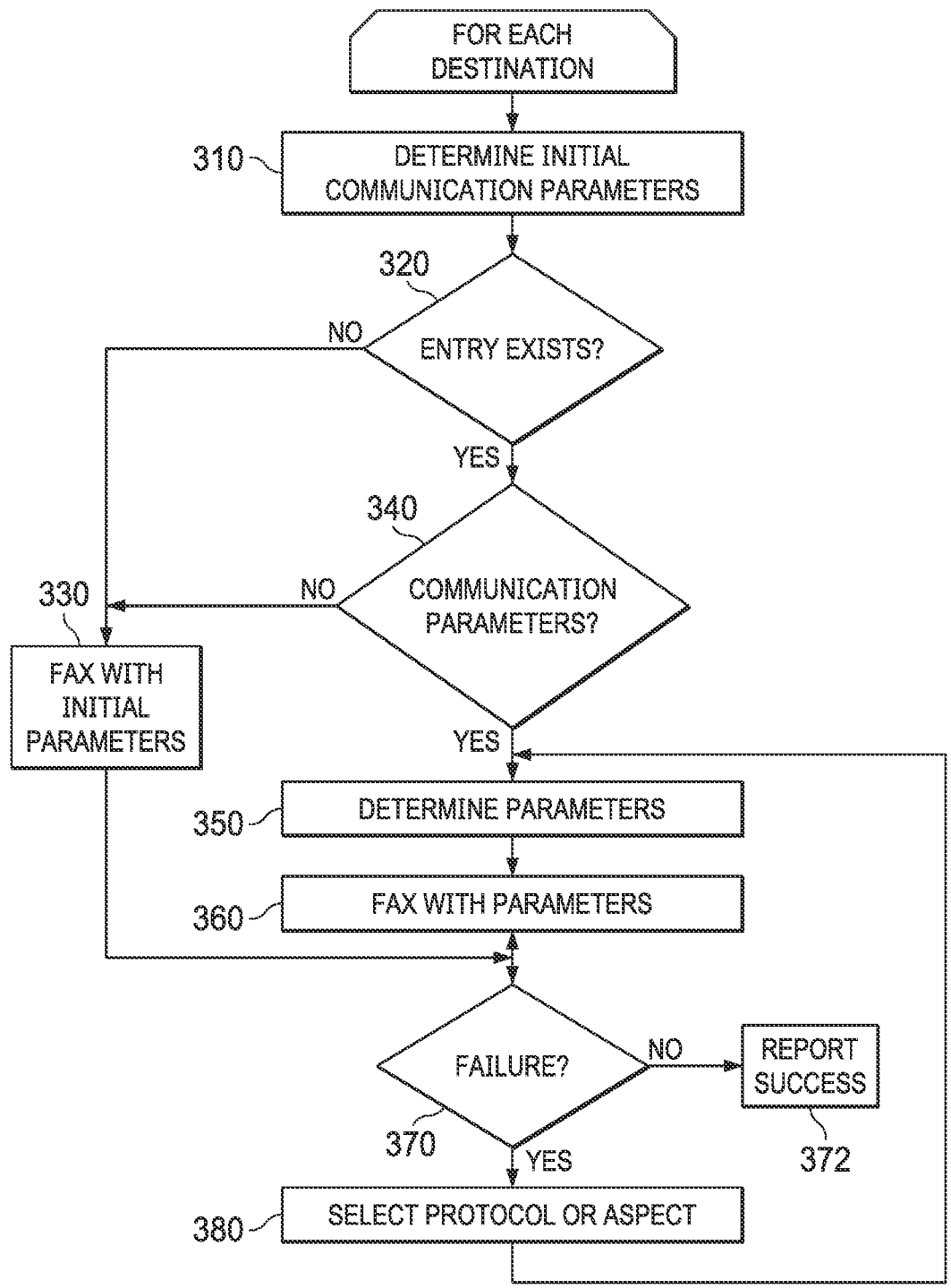
FIG. 3 depicts one embodiment of a method for sending a fax using adaptive protocol selection.
Figure 4:
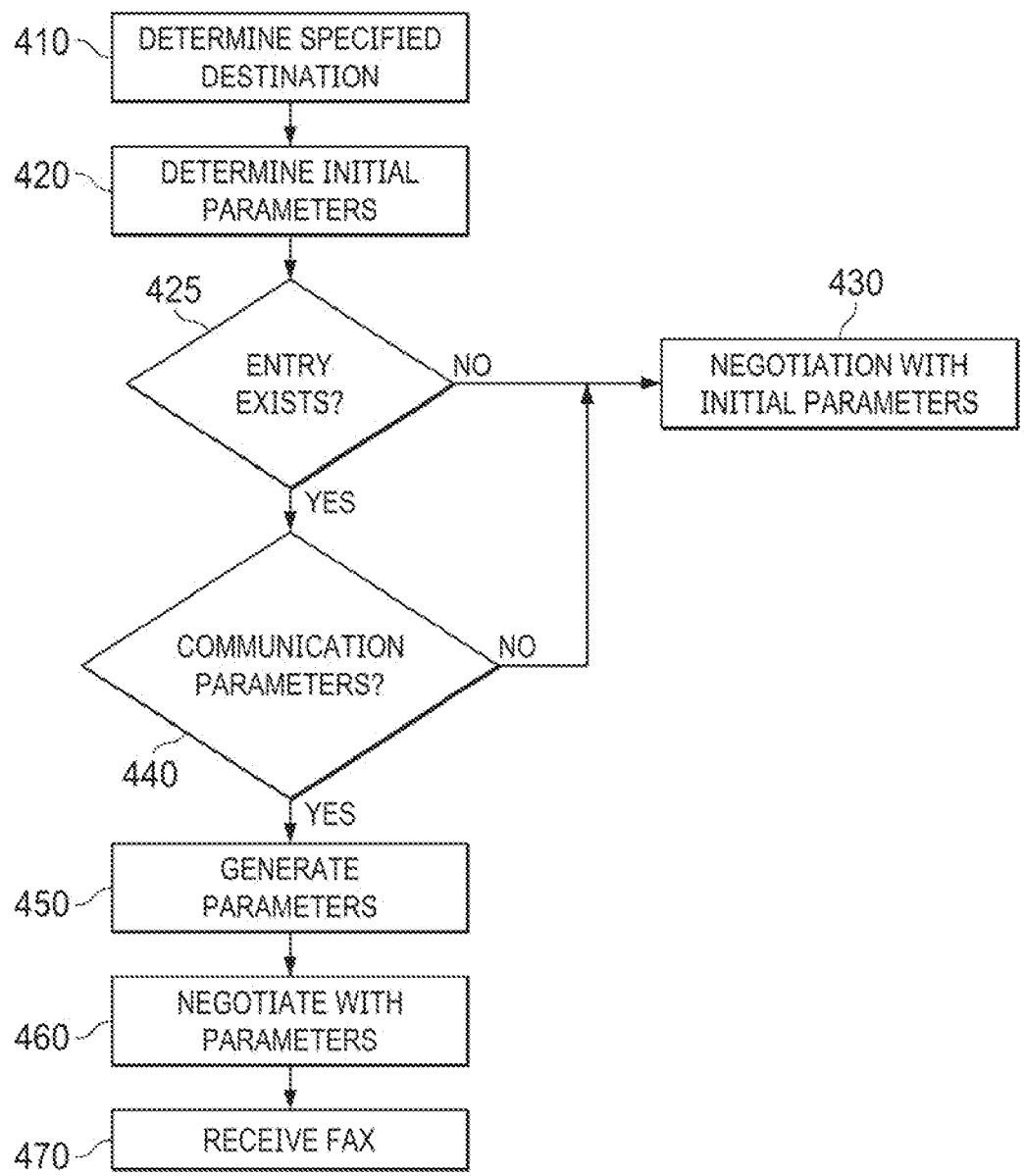
FIG. 4 depicts one embodiment of a method for receiving a fax using adaptive protocol selection.

FIGS. 3 and 4 depict, respectively, embodiments of methods for individually tailoring the transmission of a fax when sending or receiving a fax. Referring first to FIG. 3, when a fax system is sending a fax, each of the destinations specified for the fax may be iterated through. For each of the specified destinations a set of initial parameters for the fax may be determined (STEP 310) where these parameters may be default parameters, parameters specifically determined by a faxing entity or specified by the submitter or initiator of the fax. Additionally, it can be determined if a destination entry associated with the specified destination exists (STEP 320).

If no entry exists (N Branch of STEP 320) the fax may be transmitted according to the determined set of initial parameters (STEP 330). If, however, a destination entry for the specified destination exists, it can be determined if the entry includes any specified communication parameters (STEP 340).

If there are no specified communication parameters (N branch of STEP 340) the fax may be transmitted according to the determined set of initial parameters (STEP 330). If there are specified communication parameters in the entry (Y branch of STEP 340), the set of parameters for the fax request may be determined by including the values for the specified communication parameters in the entry with the initial set of parameters, or by using the values for specified parameters in the entry to override or replace a corresponding value for that parameter in the set of initial parameters (STEP 350). The fax can then be transmitted over the PSTN according to the parameters determined (STEP 360).

If the fax transmission is successful (N branch of STEP 370) a successful response may be reported (STEP 372). If, however, there is a failure transmitting the fax (Y branch of STEP 370) another protocol or aspect of a protocol may selected to attempt a re-try of the fax (STEP 380) and the fax re-tried with these new parameters (e.g., the newly selected protocol or aspect). The selection of a new protocol or aspect may be determined based on a set of rules that may define a progression of protocol or aspect selection. The protocol or aspect selection and re-try may continue until, for example, each protocol in a progression sequence has been attempted, a number of re-try attempts have occurred or more other criteria have been met.

Moving to FIG. 4, when an incoming call is received at a fax system, the incoming destination can be determined (STEP 410). A set of initial communication parameters to use for the incoming fax may be determined (STEP 420). These initial communication parameters may be, for example, the default or configured capabilities of the fax machine, server, board, etc. where the incoming call was received. It can then be determined if there is a recipient entry for the specified destination (STEP 425). If no entry exists the initial values for the communication parameters may be used in the fax negotiations with the sender for the incoming fax (STEP 430).

If, however, a recipient entry for the specified destination exists, it can be determined if the entry includes any specified communication parameters (STEP 440). If there are no specified communication parameters the initial values for the communication parameters may be used in the fax negotiations with the sender for the incoming fax (STEP 430) If there are specified communication parameters in the entry, the set of parameters to be used in the fax negotiations with the sender for the incoming fax may be generated by including the values for the specified communication parameters in the entry with the initial set of parameters, or by using the values for specified parameters in the entry to override or replace a corresponding value for that parameter in the set of initial parameters (STEP 450). The generated set of parameters may then be used in the fax negotiations with the sender for the incoming fax (STEP 460). The incoming fax can then be received (STEP 470).

The invention and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard disk (HD)), hardware circuitry or the like, or any combination.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited only those elements but may include other elements not expressly listed or inherent to such process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Embodiments of the present invention can be implemented in a computer communicatively coupled to a network (for example, the Internet, an intranet, an internet, a WAN, a LAN, a SAN, etc.), another computer, or in a standalone computer. As is known to those skilled in the art, the computer can include a central processing unit ("CPU") or processor, at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, etc.), or the like. In embodiments of the invention, the computer has access to at least one database over the network.

ROM, RAM, and HD are computer memories for storing computer-executable instructions executable by the CPU or capable of being compiled or interpreted to be executable by the CPU. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a DASD array, magnetic tape, floppy diskette, optical storage device, or other appropriate computer-readable medium or storage device.

In one exemplary embodiment of the invention, the computer-executable instructions may be lines of C++, Java, JavaScript, HTML, or any other programming or scripting code. Other software/hardware/network architectures may be used. For example, the functions of the present invention may be implemented on one computer or shared among two or more computers. In one embodiment, the functions of the present invention may be distributed in the network. Communications between computers implementing embodiments of the invention can be accomplished using any electronic, optical, radio frequency signals, or other suitable methods and tools of communication in compliance with known network protocols.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols. It will be understood for purposes of this disclosure that a module is one or more computer processes, computing devices or both, configured to perform one or more functions. A module may present one or more interfaces which can be utilized to access these functions. Such interfaces include APIs, web services interfaces presented for a web services, remote procedure calls, remote method invocation, etc.

| Feature | Description | Mode<br>V: Voice,<br>F: Fax,<br>C: Common;<br>I: Inbound,<br>O: Outbound,<br>B: Both | Keyword | Example Legal values (units) [default, if any] | Priority |
| --- | --- | --- | --- | --- | --- |
| Call Recording | Control call recording. | C, B | callrec | y \| n | 1 |
| RTP capture | Capture RTP and SIP packets. | C, O | rtpcapt | y \| n | 1 |
| Encoding types | Negotiate the fax image compression (encoding) types. | F, B | compr | A combination of 1 d 2 d and t6 (space separated). | 1 |
| ECM | Control fax error correction mode. | F, B | ecm | y \| n | 1 |
| Fax Trace log | Set fax trace logging to be on, off, or on for errors. | F, B | faxlog | y \| n \| err | 1 |
| Max data rate | Set the maximum data bit rate. In one embodiment, for certain fax boardss maxrate may only be utilized either with V34 or for outbound calls. For inbound calls using a non-V34 modulation, the negotiated data rate may be higher than maxrate and depend on the highest data rate supported by the selected modulation protocol set. | F, B | maxrate | One of 0, 2400, 4800, 7200, 9600, 12000, 14400, 19200, 16800, 21600, 23000, 24000, 26400, 28800, 31200 or 33600. (Special value 0 means no upper limit.) | 1 |
| Min data rate | Set the minimum data bit rate. | F, B | minrate | One of 2400, 4800, 7200, 9600, 12000, 14400, 19200, 16800, 21600, 23000, 24000, 26400, 28800, 31200 or 33600. | 1 |

-continued

| Feature | Description | Mode<br>V: Voice,<br>F: Fax,<br>C: Common;<br>I: Inbound,<br>O: Outbound,<br>B: Both | Keyword | Example Legal values (units) [default, if any] | Priority |
|---|---|---|---|---|---|
| Modulation types | Negotiate the fax modulation modes. | F, B | modems | A combination of V17 V33 V29 V27 V34 (space separated). | 1 |
| Tiff Save mode | Save actual tiff files being sent or received - always, never, or on error. | F, B | tiffsave | y \| n \| err | 1 |
| Fax Opt Out | Control the Fax Opt Out logic. If n, disable the fax/voice answer detection logic and the fax opt out prompt when fax tones are not detected. | F, O | faxoo | y \| n | 1 |
| Call record type | Specify the call recording type - "1w" (for single wav file) or "2w" (for dual wav files, i.e. mixed tx + rx). | C, O | crectype | 1w \| 2w | 1 |
| Silence Duration | Set the minimum silence duration to value milliseconds. | V, O | sildur | 0-100000 (milliseconds) | 1 |
| Barge-in | Control the barge-in functionality: the ability to interrupt and resume voice playback upon detection of audio from the recipient. | V, O | bargein | y \| n | 2 |
| No Answer timeout | If the recipient does not answer then time out after number seconds. | C, O | noantout | 0-300 (seconds) | 2 |
| Fax Inactivity timeout | A fax call shall time out after this number of minutes if no activity at the fax API level. | F, B | faxtout | 0-3600 (seconds) [3600] | 2 |
| Fax Detection timeout | Fax detection shall time out after this number of seconds. In one embodiment, for outbound only. | F, O | dettout | 5-1000 (seconds) [35] | 2 |
| Fax Negotiation timeout | Fax negotiation shall time out after this number of seconds. | F, B | negtout | 60-3600 (seconds) [3600] | 2 |
| App Fax Negotiation timeout | Fax negotiation shall time out after this number of seconds. | F, B | negctout | 0-1000 (seconds) | 2 |
| Fax Page timeout | Individual fax pages shall time out after this number of minutes (reset by any fax control signal). | F, B | pgtout | 1-60 (minutes) [60] | 2 |
| Fax Total Page timeout | Individual fax pages shall time out after this number of minutes. In one embodiment, for inbound only. | F, I | pgttout | 0-120 (minutes) | 2 |
| Consecutive bad scanlines | Set the maximum number of allowable consecutive bad fax scan lines to number. In one embodiment, for inbound only. | F, I | cbadlines | 0-10000 | 2 |
| Percentage bad scanlines | Set the maximum percentage of allowable bad scan lines to number. In one embodiment, for inbound only. | F, I | pbadlines | 0 to 100 (%) | 2 |
| Force Play delay | Set the force play delay to number milliseconds. | V, O | fpdelay | 0-50000 (milliseconds) | 2 |
| Destination Number | Destination number exactly as it is to be dialed on the outbound call. | C, O | dnum | A string of decimal digits | 2 |
| Origination Number | Origination number exactly as it is to be applied to the outbound call. | C, O | onum | A string of decimal digits | 2 |
| Fax Subscriber Id | T.30 fax subscriber identification string. Applied to CSI for inbound and TSI for outbound. | F, B | faxid | An ASCII string (i.e. "Company X, Ltd" or "732-555-1234") | 2 |
| Max Fax Pages | Limit the number of fax pages to be received. | F, I | maxpgs | 1-950 | 2 |
| Extension dial delay | Delay value in milliseconds before dialing the extension. | C, O | extdelay | 0-100000 (milliseconds) | 3 |
| Minimum DTMF duration | DTMF (touch tone) input must last at least number milliseconds to be recognized. | C, B | dtmfdur | 0-10000 (milliseconds) | 3 |
| RFC 2833 DTMF | Use DTMF as specified in RFC 2833. | C, B | rfc2833 | y \| n | 3 |

-continued

| Feature | Description | Mode V: Voice, F: Fax, C: Common; I: Inbound, O: Outbound, B: Both | Keyword | Example Legal values (units) [default, if any] | Priority |
|---|---|---|---|---|---|
| Use special IE | Insert special info element for outgoing ISDN call as specified by the hex bytes (space separated). | C, O | specie | Space separated hex octet string (i.e. "1A 04 2B . . . ") | 3 |
| Fax protocol (T.30/T.38) | Set the allowable fax protocols - either T30 or T38. | F, B | faxproto | T30 | T38 | 3 |
| Vendor selection | Set which vendor card/API to use. | F, B | vendor | aculab | brooktrout|manufacturer name | 3 |
| AGC (auto gain control) | Enable/disable automatic gain control. | V, B | agc | y | n | 3 |
| Playback volume | Set the audio playback volume. | V, B | playvol | −100 to 100 | 3 |
| Barge-in type (all audio or speech only) | Set the barge-in type to any audio or speech only. | V, O | bargeintype | audio | speech | 3 |
| Voice Delivery Method | Set the voice delivery method value. "p" for PAMD, "s" for SILENCE, "f" for FORCEPLAY, "pvm" - PAMD_VOICEMAIL_ONLY, "pl" - PAMD_LIVE_ONLY, "pf" - PAMD_FORCE. | V, O | vdm | p | s | f | pvm | pl | pf | 3 |
| Call Progress type | A lower level parameter to specify which call progress analysis options to use. | C, O | cptype | Name or location of rule set or file specifying call progress | 3 |

What is claimed is:

1. A system, comprising:
   a data store storing one or more entries, each entry associated with a destination for a fax and one or more communication parameters, each communication parameter having an associated value;
   a non-transitory computer readable medium comprising instructions for:
   receiving a first fax;
   determining values for the one or more communication parameters for the first fax based on the entries in the data store;
   facilitating the transmission of the first fax using the associated values as transmission values of the one or more communication parameters;
   determining a failure associated with the transmission of the first fax according to the transmission values of the one or more communication parameters;
   in response to determining the failure associated with the transmission of the first fax, determining an updated value for the one or more communication parameters to use for facilitating the transmission of the first fax by replacing the transmission value of the one or more communication parameters with the updated value for the one or more communication parameters according to one or more parameter selection rules associated with the communication parameter; and
   continuing to facilitate the transmission of the first fax according to the updated value of the one or more communication parameters.

2. The system of claim 1, wherein the updated value for each of the one or more communication parameters that replaces the respective transmission value for that communication parameter is determined based on the application of the one or more parameter selection rules for the one or more communication parameters.

3. The system of claim 1, wherein determining values for the one or more communication parameters for the first fax based on the entries in the data store comprises determining there is no entry associated with the first fax and using default values as the determined values for the one or more communication parameters.

4. The system of claim 3, wherein the instructions are further for creating a first entry in the data store for a first destination associated with the first fax when it is determined there is no entry associated with the first fax.

5. The system of claim 1, wherein the transmission of the first fax is at least partially over a Publicly Switched Telephone Network (PSTN).

6. The system of claim 5, wherein facilitating the transmission of the first fax comprises sending the first fax.

7. The system of claim 1, wherein the one or more communication parameters are associated with a fax protocol, a network protocol, error correction, or data rate.

8. A method, comprising:
   maintaining a data store storing one or more entries, each entry associated with a destination for a fax and one or more communication parameters, each communication parameter having an associated value;
   receiving a first fax;
   determining values for the one or more communication parameters for the first fax based on the entries in the data store;
   facilitating the transmission of the first fax using the associated values as transmission values of the one or more communication parameters;
   determining a failure associated with the transmission of the first fax according to the transmission values of the one or more communication parameters;
   in response to determining the failure associated with the transmission of the first fax, determining an updated value for the one or more communication parameters to use for facilitating the transmission of the first fax by replacing the transmission value of the one or more communication parameters with the updated value for the one or more communication parameters accordng to one or more parameter selection rules associated with the communication parameter; and continuing to facilitate the transmission of the first fax according to the updated value of the one or more communication parameters.

9. The method of claim 8, wherein the updated value for each of the one or more communication parameters that replaces the respective transmission value for that communication parameter is determined based on the application of the one or more parameter selection rules for the one or more communication parameters.

10. The method of claim 8, wherein determining values for the one or more communication parameters for the first fax based on the entries in the data store comprises determining there is no entry associated with the first fax and using default values as the determined values for the one or more communication parameters.

11. The method of claim 10, further comprising creating a first entry in the data store for a first destination associated with the first fax when it is determined there is no entry associated with the first fax.

12. The method of claim 8, wherein the transmission of the first fax is at least partially over a Publicly Switched Telephone Network (PSTN).

13. The method of claim 12, wherein facilitating the transmission of the first fax comprises sending the first fax.

14. The method of claim 8, wherein the one or more communication parameters are associated with a fax protocol, a network protocol, error correction, or data rate.

15. A non-transitory computer readable medium, comprising instructions for:

maintaining a data store storing one or more entries, each entry associated with a destination for a fax and one or more communication parameters, each communication parameter having an associated value;

receiving a first fax;

determining values for the one or more communication parameters for the first fax based on the entries in the data store;

facilitating the transmission of the first fax using the associated values as transmission values of the one or more communication parameters;

determining a failure associated with the transmission of the first fax according to the transmission values of the one or more communication parameters;

in response to determining the failure associated with the transmission of the first fax, determining an updated value for the one or more communication parameters to use for facilitating the transmission of the first fax by replacing the transmission value of the one or more communication parameters with the updated value for the one or more communication parameters according to one or more parameter selection rules associated with the communication parameter; and continuing to facilitate the transmission of the first fax according to the updated value of the one or more communication parameters.

16. The non-transitory computer readable medium of claim 15, wherein the updated value for each of the one or more communication parameters that replaces the respective transmission value for that communication parameter is determined based on the application of the one or more parameter selection rules for the one or more communication parameters.

17. The non-transitory computer readable medium of claim 15, wherein determining values for the one or more communication parameters for the first fax based on the entries in the data store comprises determining there is no entry associated with the first fax and using default values as the determined values for the one or more communication parameters.

18. The non-transitory computer readable medium of claim 17, further comprising instructions for creating a first entry in the data store for a first destination associated with the first fax when it is determined there is no entry associated with the first fax.

19. The non-transitory computer readable medium of claim 15, wherein the transmission of the first fax is at least partially over a Publicly Switched Telephone Network (PSTN).

20. The non-transitory computer readable medium of claim 19, wherein facilitating the transmission of the first fax comprises sending the first fax.

21. The non-transitory computer readable medium of claim 15, wherein the one or more communication parameters are associated with a fax protocol, a network protocol, error correction, or data rate.

* * * * *

UNITED STATES PATENT AND TRADEMARK OFFICE
CERTIFICATE OF CORRECTION

| | |
|---|---|
| PATENT NO. | : 12,212,727 B2 |
| APPLICATION NO. | : 18/491273 |
| DATED | : January 28, 2025 |
| INVENTOR(S) | : Michael Alexander Preobrazhensky, Philippe C. Haussy and David M. Hayden |

Page 1 of 1

It is certified that error appears in the above-identified patent and that said Letters Patent is hereby corrected as shown below:

In the Claims

In Claim 8, Column 21, at Line 5, replace "accordng" with --according--.

Signed and Sealed this
Twenty-seventh Day of January, 2026

John A. Squires
*Director of the United States Patent and Trademark Office*